United States Patent
Mimura et al.

(10) Patent No.: US 7,447,339 B2
(45) Date of Patent: Nov. 4, 2008

(54) UNIQUE CODE GENERATING APPARATUS, METHOD, PROGRAM AND RECORDING MEDIUM

(75) Inventors: Masahiro Mimura, Kawasaki (JP);
Kenta Takahashi, Kawasaki (JP);
Kazuo Takaragi, Ebina (JP);
Masakatsu Nishigaki, Hamamatsu (JP);
Yoichi Shibata, Hamamatsu (JP)

(73) Assignee: Hitachi, Ltd., Tokyo (JP)

( * ) Notice: Subject to any disclaimer, the term of this patent is extended or adjusted under 35 U.S.C. 154(b) by 669 days.

(21) Appl. No.: 10/964,683

(22) Filed: Oct. 15, 2004

(65) Prior Publication Data
US 2005/0135661 A1 Jun. 23, 2005

(30) Foreign Application Priority Data
Oct. 17, 2003 (JP) .............................. 2003-357595

(51) Int. Cl.
*G06K 9/00* (2006.01)
(52) U.S. Cl. ..................... 382/124; 382/125; 382/190
(58) Field of Classification Search ......... 382/115–116, 382/124–126, 128, 190, 195
See application file for complete search history.

(56) References Cited

FOREIGN PATENT DOCUMENTS

| JP | 9-198501 | 7/1997 |
|----|----------|--------|
| JP | 10-124668 | 5/1998 |
| JP | 10-149446 | 6/1998 |

*Primary Examiner*—Sheela C Chawan
(74) *Attorney, Agent, or Firm*—Antonelli, Terry, Stout & Kraus, LLP.

(57) ABSTRACT

A unique code generating apparatus for generating, according to biometric information representing a physical or behavioral feature of a user, a unique code as a unique value for the biometric information includes a statistic information generating section for conducting statistical analysis for a feature of biometric information for registration and generating statistic information, a statistic information table generating section for summarizing the statistic information for each biometric information, setting a unique code for each statistic information, and generating a statistic information table unique to the biometric information, a unique code extracting section for applying to the statistic information table the statistic information generated by the statistic information generating section according to biometric information for collation and extracting an associated unique code from the table, and an output processing section for outputting the unique code extracted by the unique code extracting section to an output interface.

7 Claims, 6 Drawing Sheets

FEATURE B
FEATURE C
FEATURE D
FEATURE A

FEATURE E

FIG.6

|  | | FINGERPRINT IMAGE INDEX | | | | | | | | | |
|---|---|---|---|---|---|---|---|---|---|---|---|
|  | | 1 | 2 | 3 | 4 | 5 | 6 | 7 | 8 | 9 | 10 |
| FEATURE | A | 12 | 13 | 12 | 11 | 12 | 12 | 11 | 10 | 13 | 13 |
| | B | 32 | 33 | 33 | 32 | 34 | 31 | 33 | 31 | 32 | 33 |
| | C | - | - | - | - | - | - | - | - | - | - |
| | D | - | - | - | - | - | - | - | - | - | - |
| | E | - | - | - | - | - | - | - | - | - | - |

600

UNIQUE CODE GENERATING APPARATUS, METHOD, PROGRAM AND RECORDING MEDIUM

INCORPORATION BY REFERENCE

The present application claims priority from Japanese application JP2003-357595 filed on Oct. 17, 2003, the content of which is hereby incorporated by reference into this application.

BACKGROUND OF THE INVENTION

The present invention relates to an apparatus for and a method of generating a unique code and a program and a recording medium, and in particular, to a technique for use with an information system providing services only to users beforehand registered thereto. The technique is applicable, for example, to access management when a user accesses the system, identification of a person receiving a service provided by the system for pay, and entrance and exit management for entrance into and exit from important facilities and rooms.

An authentication method using information of a living body or biometric information has been proposed, for example, in JP-A-09-198501. That is, there is provided a fingerprint-collation entrance-exit managing system to mange entrance into and exit from a room. The system includes a host device including a file in which personal information such as an identifier number and entrance admission information to enter a room and registered fingerprint data are stored with a correspondence established therebetween and a gate being connected to the host device and including a fingerprint collating section for storing therein the personal information and the registered fingerprint data downloaded from the file and collating the data with a fingerprint impression of a person. The fingerprint collating section of the gate includes a controller for updating, when the person is confirmed or identified by the collation between the fingerprint impression and the registered fingerprint data, the registered fingerprint data by adding a time stamp thereto. The host device includes a control processing section which collects the registered fingerprint data including the time stamp to update the registered fingerprint data and which sends the registered fingerprint data thus updated to the gate according to the entrance admission information of the personal information.

There has been proposed a fingerprint collating method in a system, for example, in JP-A-10-124668. According to this article, the system includes a fingerprint registering and collating device and a fingerprint collating system terminal. The terminal includes a fingerprint image collecting section for collecting a fingerprint image of a user, an information input section for inputting user information, a fingerprint image storage for storing the fingerprint image collected by the collecting section, a fingerprint reference point detector for detecting a position aligning fingerprint reference point from the fingerprint image, and an image separating section for separating a partial image from fingerprint image according to a separating position indicated by the fingerprint registering and collating device. The fingerprint registering and collating device includes a registered fingerprint information storage for storing fingerprint information registered thereto in advance, a separating position determining section for determining a separating position of a partial image necessary for fingerprint collation, a partial image storage for storing the partial image separated from the fingerprint image, and a feature point collating section for conducting collation for feature points of the fingerprint image. In the system, the fingerprint collating system terminal and the fingerprint registering and collating device exchange, through data communication, data items including the position aligning fingerprint reference point, the separating position of the partial image necessary for fingerprint collation, and the partial image separated from the fingerprint image to thereby achieve the fingerprint collation.

Also, there has been proposed a fingerprint collating apparatus, for example, in JP-A-10-149446. The apparatus includes a data processing circuit for extracting features from image information obtained from a fingerprint detecting section and a comparator for comparing the features processed by the data processing circuit with data which is stored in a storage and for which feature extraction is beforehand conducted.

However, in the conventional person authentication using biometric information of a living body, it is required that the features extracted from the information as a basis of authentication are beforehand stored to be kept on the side of the authentication system. The features of the biometric information of the user beforehand stored and kept on the system side are called a template. The template is information (personal information) to identify the person. There remains hence a problem to be solved, that is, from a viewpoint of privacy protection, the template is required to be protected at a great cost.

SUMMARY OF THE INVENTION

It is therefore an object of the present invention to provide an apparatus for and a method of generating a unique code and a program and a recording medium in which security is satisfactorily guaranteed in authentication of a person and efficient operation is possible in the authentication.

To achieve the object according to the present invention, which is devised to remove the problem, there is provided a unique code generating apparatus for generating, according to biometric information representing a physical or behavioral feature of a user, a unique code as a unique value for the biometric information. The apparatus includes a statistic information generating section for conducting statistical analysis for a feature of biometric information for registration and generating statistic information, a statistic information table generating section for summarizing the statistic information for each biometric information, setting a unique code for each statistic information, and generating a statistic information table unique to the biometric information, a unique code extracting section for applying to the statistic information table the statistic information generated by the statistic information generating section according to biometric information for collation and extracting an associated unique code from the table, and an output processing section for outputting the unique code extracted by the unique code extracting section to an output interface.

According to the present invention, there is provided a unique code generating method of generating, according to biometric information representing a physical or behavioral feature of a user, a unique code as a unique value for the biometric information. The method includes a statistic information generating step of conducting statistical analysis for a feature of biometric information for registration and generating statistic information, a statistic information table generating step of summarizing the statistic information for each biometric information, setting a unique code for each statistic information, and generating a statistic information table unique to the biometric information, a unique code extracting step of applying to the statistic information table the statistic information generated by the statistic information generating step according to biometric information for collation and extracting an associated unique code from the table, and an output processing step of outputting the unique code extracted by the unique code extracting step to an output interface.

According to the present invention, there is provided a program product for implementing on a computer a unique code generating method of generating, according to biometric information representing a physical or behavioral feature of a user, a unique code as a unique value for the biometric information. The program product includes a statistic information generating step of conducting statistical analysis for a feature of biometric information for registration and generating statistic information, a statistic information table generating step of summarizing the statistic information for each biometric information, setting a unique code for each statistic information, and generating a statistic information table unique to the biometric information, a unique code extracting step of applying to the statistic information table the statistic information generated by the statistic information generating step according to biometric information for collation and extracting an associated unique code from the table, and an output processing step of outputting the unique code extracted by the unique code extracting step to an output interface. The unique code generating program product includes codes to conduct operations of the respective steps.

According to the present invention, there is provided a computer-readable recording medium having recorded the unique code generating program.

Other problems and methods of removing the problems described in the present specification will become more apparent from the description of embodiments taken in conjunction with drawings.

According to the present invention, security is satisfactorily guaranteed in authentication of a person and efficient operation is possible in the authentication.

BRIEF DESCRIPTION OF THE DRAWINGS

FIG. 6 is a diagram showing a temporary table of statistic information processing in the embodiment.

DESCRIPTION OF THE EMBODIMENTS

Figure 1:
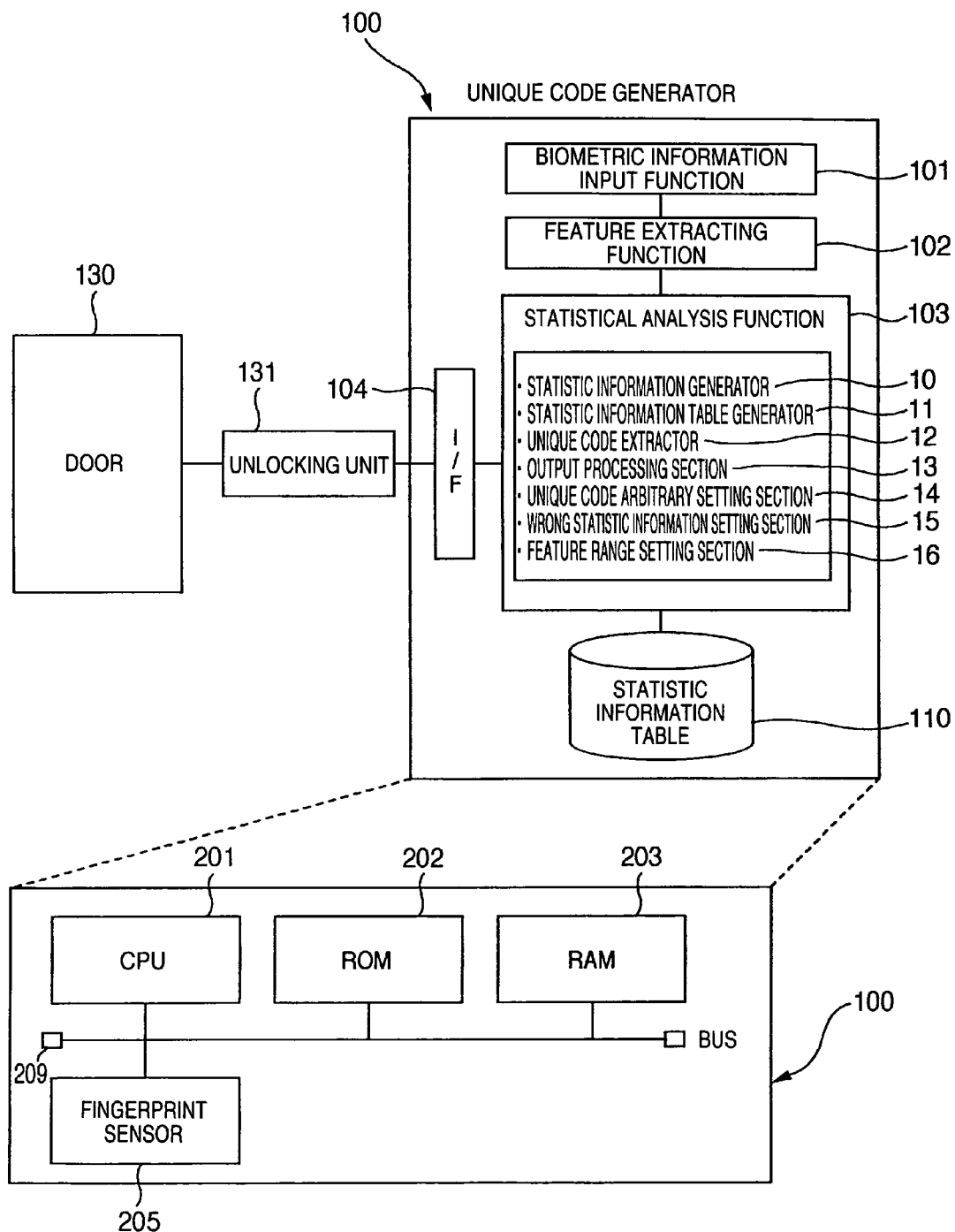
FIG. 1 is a network diagram including a unique code generator according to the embodiment.

Referring now to the accompanying drawings, description will be given of an embodiment according to the present invention. FIG. 1 shows a network configuration diagram including a unique code generator 100 according to the embodiment. In the embodiment, it is assumed that the present invention is applied to an entrance admittance managing system to allow a user to enter a room. For example, in a situation in which when a value, i.e., a unique code outputted from the generator 100 according to biometric information of a user prepared for verification matches a unique code outputted according to biometric information of the user beforehand set for registration, the door of the room is unlocked. Although the unique code generator is used as a unit (or a part thereof) to unlock the door in the embodiment, the present invention is not restricted by the embodiment but is generally applicable to service systems requiring confirmation or identification of users of the systems.

The network configuration includes, in addition to the unique code generator 100, a door 130, and an unlock unit 131 to unlock the door 130 when the unique code generated by the unique code generator 100 matches a unique code of the user set in advance. Although it is assumed for simplification that only one user can unlock the door in the embodiment, the present invention is not restricted by the embodiment. When the unique code generator 100 includes statistic information tables 110 as many as there are users and the unlock unit 131 keeps unique codes for the respective users, a plurality of users can unlock the door 130.

The unique code generator 100 includes a biometric information input function 101 to input biometric information presented by a user, a feature extracting function 102 to extract a feature of the biometric information, a statistical analysis function 103 to conduct statistical analysis of the feature, an input/output interface 104 for the unique code generator 100 to conduct data communication with an external device such as an unlock unit 131 and to conduct data input and output operations, and a statistic information table 110 to set and to store a unique code for each biometric information presented by the user.

The statistical analysis function 103 includes functional blocks as below. The function 103 includes a statistic information generator 10 which executes statistical analysis for the feature of biometric information prepared for registration and which resultantly generates statistic information, a statistic information table generator 11 which summarizes the statistic information for each biometric information to set a unique code for each statistic information and which thereby generates a statistic information table 110 unique to the biometric information, a unique code extractor 12 which applies the statistic information generated by the statistic information generator 10 according to biometric information prepared for collation to the statistic information table 110 to thereby extract an associated unique code therefrom, and an output processing section 13 to output the unique code extracted by the unique code extractor 12 to the output interface 104.

The statistical analysis function 103 further includes a unique code arbitrary setting section 14 which sets the unique code to be set for each statistic information in the statistic information table 110 to random information including a character, a numeral, or a code or to arbitrary information received via the input interface 104 and a wrong statistic information setting section 15 which sets to the statistic information table .110, in addition to the statistic information generated according to the feature of biometric information for registration, wrong statistic information to which a wrong unique code other than the unique code of the associated statistic information is set.

Also, the statistical analysis function 103 includes a feature range setting section 16 which sets the statistic information in the statistic information table 110, specifically, in a feature range between an upper-limit value and a lower-limit value using numbers of features of the statistic information generated by the statistic information generator 10.

The unique code generator 100 includes a hardware configuration including a Central Processing Unit (CPU), a Read-Only Memory (ROM) 202, a Random Access Memory (RAM) 203, and a fingerprint sensor 205. The constituent components can communicate data via a bus 209 and the CPU 201 with each other. While writing necessary data in or reading necessary data from the RAM 203, the CPU 201 executes a program stored in the ROM 202 using data in the ROM 202. The program includes programs to respectively implement the biometric information input function 101, the feature extracting function 102, and the statistical analysis function 103 and is stored in the ROM 202.

Although the ROM 202 is used as the storage in the embodiment, the present invention is not restricted by the embodiment. In place of the ROM 202, a nonvolatile memory such as an electrically erasable programmable ROM (EEPROM) or a fixed storage such as a hard disk may be used. For the fingerprint sensor 205, an existing fingerprint sensor can be used.

Figure 2A:
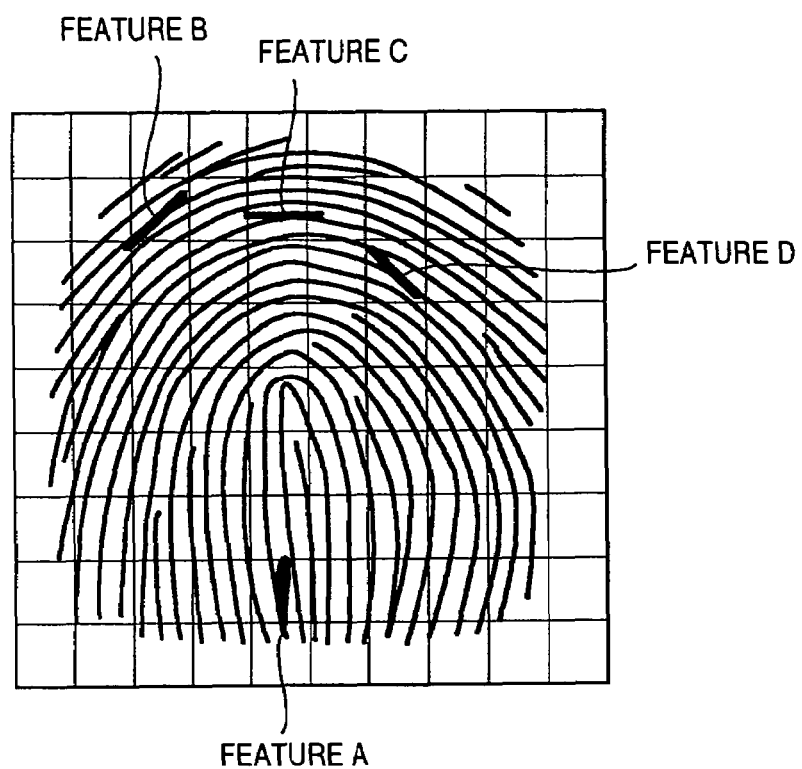
FIG. 2A is a diagram to explain features using projected lines of a fingerprint.
Figure 2B:
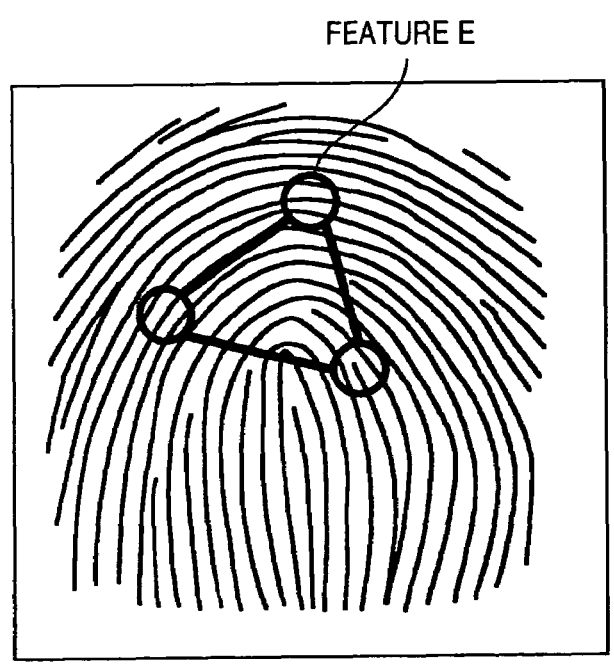
FIG. 2B is a diagram to explain features using geometric structure of feature points of a fingerprint.

Next, description will be given of the feature obtained from the biometric information. FIG. 2A is a diagram to explain features using projected lines of a fingerprint. FIG. 2B is a diagram to explain features using geometric structure of feature points of a fingerprint. Assume that fingerprint information is used as biometric information and five types A to E of features are obtained from the fingerprint information.

In FIG. 2A, the features A to D are defined according to directions of projected lines in small areas obtained by subdividing a fingerprint image. For example, the feature A is defined by a vertical direction and the feature C is defined by a horizontal or lateral direction. Although the image is subdivided into a small number of sub-areas and the number of discretization for each direction is small for convenience of description of the embodiment, the present invention is not restricted by the embodiment. In FIG. 2A, the number of the features A is equivalent to the number of small areas in which projected lines are drawn in the vertical direction. The other features are also considered in a similar way.

On the other hand, the feature E of FIG. 2B is defined according to feature points (end points and branch points of projected or depressed lines) of the fingerprint existing in an area enclosed by each circle. The feature E is a geometric contour or arrangement formed by the feature points. In the embodiment, an example of a regular triangle is shown as the geometric contour. That is, characteristic points having a positional relationship of a regular triangle is set as a feature E and the number of features E indicates the number of combinations of feature points with a positional relationship of a regular triangle. Although the geometric feature is a regular triangle in the embodiment, the present invention is not restricted by the embodiment. The feature may be set to any contour.

Figure 3:
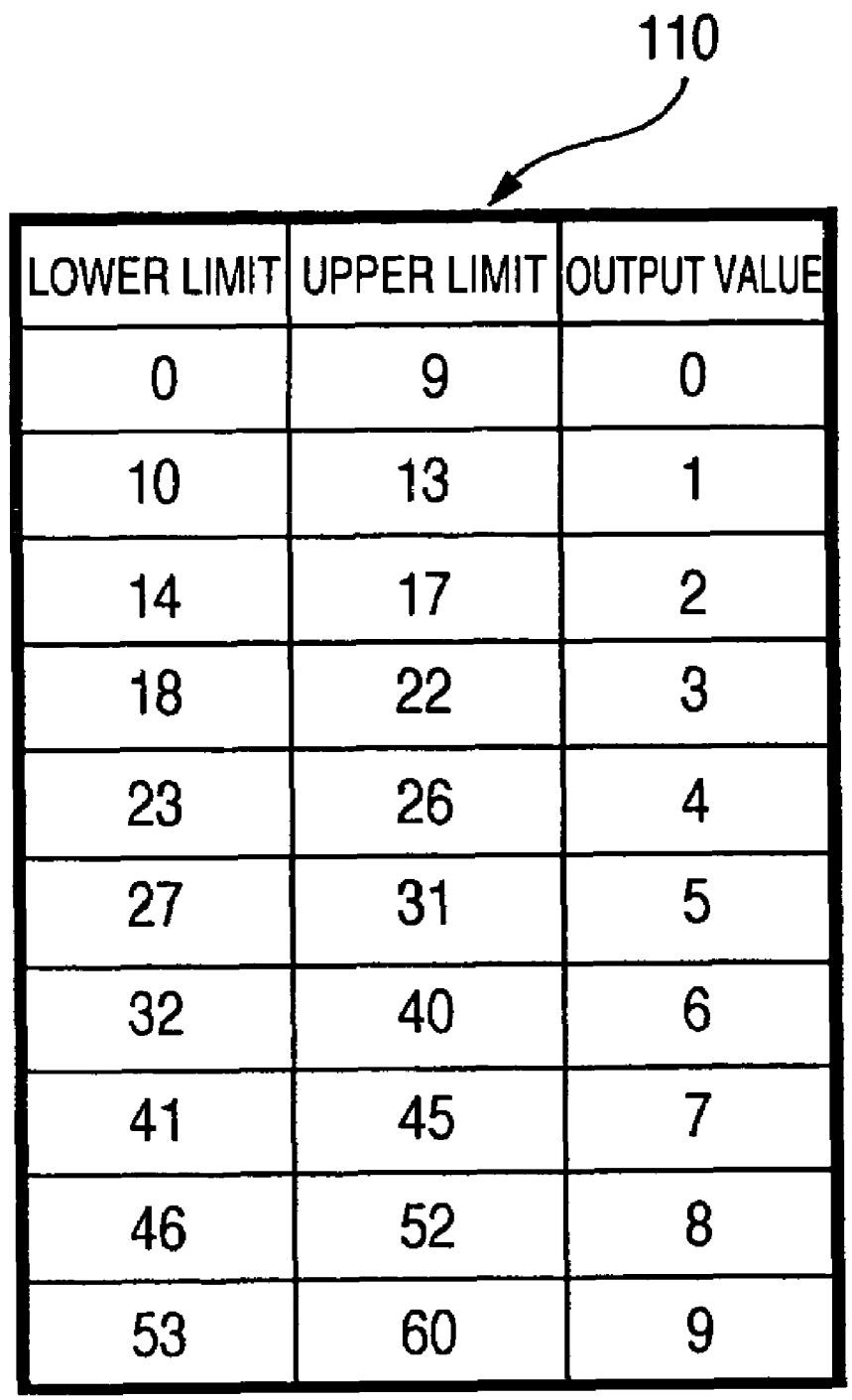
FIG. 3 is a diagram showing an example of a statistic information table in the embodiment.

Next, description will be given of a data layout of the statistic information table 110. FIG. 3 shows an example of the statistic information table 110 in the embodiment. The statistic information table generator 11 processes the statistic information generated by the statistic information generator 10 to summarize the information for each biometric information and sets a unique code for each statistic information to thereby generate a table unique to the biometric information, i.e., a statistic information table 110.

The unique code arbitrary setting section 14 may set the unique code to be set for each statistic information in the statistic information table 110 to random information such as a character, a numeral, or a code or to arbitrary information received via the input interface 104.

The wrong statistic information setting section 15 may set to the statistic information table 110, in addition to the statistic information generated according to the feature of biometric information for registration, wrong statistic information to which a wrong unique code other than the unique code of the associated statistic information is set.

The feature range setting section 16 may set the statistic information in the statistic information table 110, specifically, in a feature range between an upper-limit value and a lower-limit value using numbers of features of the statistic information generated by the statistic information generator 10.

The statistic information table 110 in the embodiment includes records each of which including a lower limit of the number of features existing in a fingerprint image, an upper limit thereof, and an output value, i.e., a unique code corresponding to the range between the lower limit and the upper limit. As above, when five types of features (features A to E) are assumed, the statistic information table is constructed for each of the five types of features.

In the unique code generator 100 of the embodiment, the respective functions 101 to 103 are arranged in the generator 100. However, the equivalent system may be configured using, for example, a network. Although the embodiment adopts fingerprint information as biometric information, the present invention is not restricted by the embodiment. Various biometric information items such as a voiceprint, an iris, and handwriting may also be adopted.

Next, description will be given of an outline of the unique code generating method in the embodiment. The user first registers a fingerprint to the unique code generator 100. In the registration, the user conducts the fingerprint input operation a plurality of times via the input/output interface 104 of the generator 100 to the biometric information function 101. Although the number of input operations is not particularly restricted, it is assumed in the embodiment that the user conducts the input operation, for example, ten times.

The feature extractor 102 of the generator 100 extracts a plurality of types of features from respective fingerprint images. The number of types of features are not restricted. However, as described above, the embodiment uses, for example, five types of features. Thereafter, for each feature type, the feature extractor 102 calculates the number of features included in each fingerprint image and passes results of the calculation to the statistical analysis function 103.

Next, the function 103 conducts statistical analysis for each feature. Specifically, according to the number of features of each type received from the feature extractor 102, the statistical analysis function 103 predicts a range in which the features are distributed. Although any predicting method may be used, the embodiment uses a method in which the range of features is defined by an upper limit and a lower limit of the number of features contained in one fingerprint image. However, the present invention is not restricted by the embodiment.

The statistical analysis function 103 assigns, as an output value (unique code), a value beforehand determined for a range in which the features are distributed and records the value in the statistic information table 110. The output value is beforehand determined in the embodiment for simplification of description. However, the present invention is not restricted by the embodiment. That is, it is also possible for a user or a manager of the unique code generator 100 to assign a particular output value by use of a device to input the output value.

As already described above, the statistical analysis function 103 sets using the wrong statistic information setting section 15, in addition to the statistic information generated according to the feature of biometric information for registration, wrong statistic information to which a wrong unique code other than the unique code of the associated statistic information is set. As a result, the function 103 adds a record including a meaningless feature range and an meaningless output value to the statistic information table 110. Description has been given of the registration processing.

When the user desires to open the door 130, the user first inputs the fingerprint registered as above to the biometric information input function 101 of the unique code generator 100. The feature extractor 102 calculates the number of features from the fingerprint image in almost the same method as for the registration and passes the number to the statistical analysis function 103. The function 103 refers to the statistic information table 110 to obtain an output value assigned to a range between an upper limit and a lower limit associated with the number of features. By executing the processing for the five types of features (to be) obtained from the fingerprint information, the unique code generator 100 finally generates an output code. The output code is, for example, a string of the unique codes of the five types of features or a code obtained by conducting various computations for a combination of the unique codes of the five types of features. When the number of figures of the output code is increased, security is improved in the personal authentication.

Next, description will be given in detail of the procedure of the unique code generating method in the embodiment. Various operations for the unique code generating method described below are implemented by the program (to realize the functions 101 to 103) of the ROM 202 in the unique code generator 100. The program includes codes to conduct operations described as below.

Figure 4:
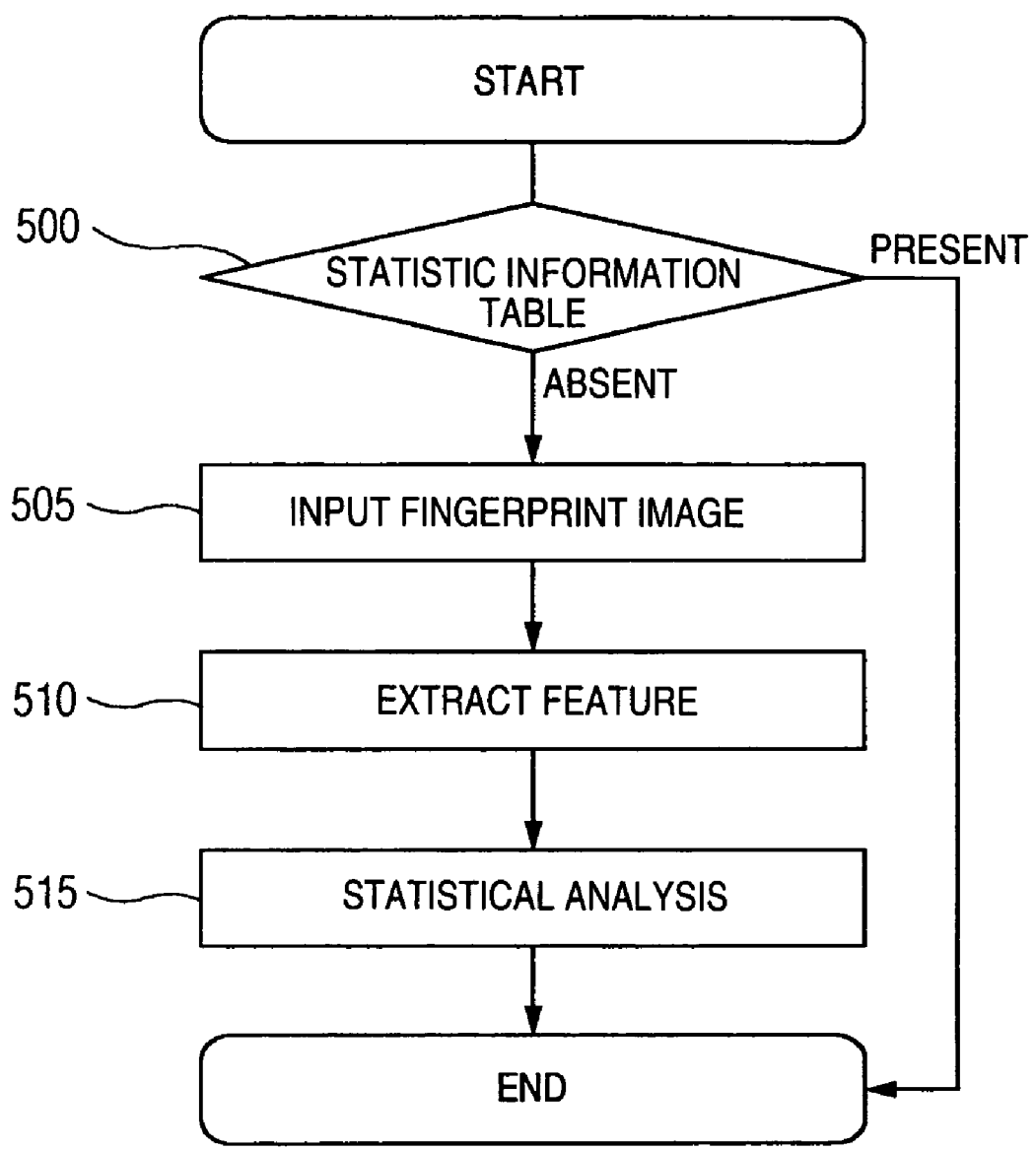
FIG. 4 is a flowchart showing registration processing in the embodiment.

FIG. 4 shows the registration processing of the embodiment in a flowchart. According to fingerprint information of each user as a basis of the personal authentication, statistic information and a unique code are set and registered. A check is made to determine whether or not a statistic information table 110 is beforehand registered for a predetermined feature of the user (step 500). If the table 110 is beforehand registered (present in step 500), the processing is terminated and control goes to processing for personal authentication. If the table 110 is not registered yet (absent in step 500), control goes to step 505.

Assume that the user places his or her finger on the fingerprint sensor 205 and the sensor 205 reads fingerprint information. The sensor 205 inputs a fingerprint image to the biometric information input function 101 (step 505). The function 101 temporarily keeps the fingerprint image in the RAM 203. By repeating the operation, the fingerprint image is obtained ten times.

The feature extracting function 102 extracts features from the fingerprint image obtained in step 505 and records the number of features in a temporary table 600 (step 510). FIG. 6 shows an example in which the numbers of the features A and B are registered to the table 600 for each of the ten fingerprint reading operations, i.e., first to tenth fingerprint reading operations. For the feature extracting method to conduct the extraction of direction of projected lines from a fingerprint image and the extraction of feature point therefrom, the method described in JP-A-2001-344213 or the like can be used. The feature extraction processing is executed for all fingerprint images.

The statistical analysis function 103 then executes statistical analysis processing according to the temporary table 600 of FIG. 6 (step 515). Specifically, the function 103 predicts the distribution of the numbers of features using the temporary table 600 to determine the upper and lower limits of the numbers of features. Any appropriate predicting method may be used to predict the distribution of the numbers of features. The embodiment uses the maximum and minimum values of actually observed values as the upper and lower limits, respectively. For example, the upper and lower limits of the feature point A are respectively 13 and 10 and those of the feature point B are respectively 34 and 31 in the example of FIG. 6.

The statistical analysis function 103 assigns a predetermined value as a unique code to the output value of the feature point. In the embodiment, a predetermined value is assigned as a unique code for simplification of description. However, by disposing an appropriate input device in the statistical analysis function 103, it is possible to freely set the value to be assigned as the unique code.

The meaningless upper limits, lower limits, and output values determined as above are stored in the statistic information table 110 shown in FIG. 3. This table includes data for the feature A. In the table 110, meaningless upper limits, lower limits, and output values are assigned to the rows excepting the row in which the upper limit is 13 and the lower limit is 10. The processing described above is executed for all features to finally keep five statistic information tables.

Figure 5:
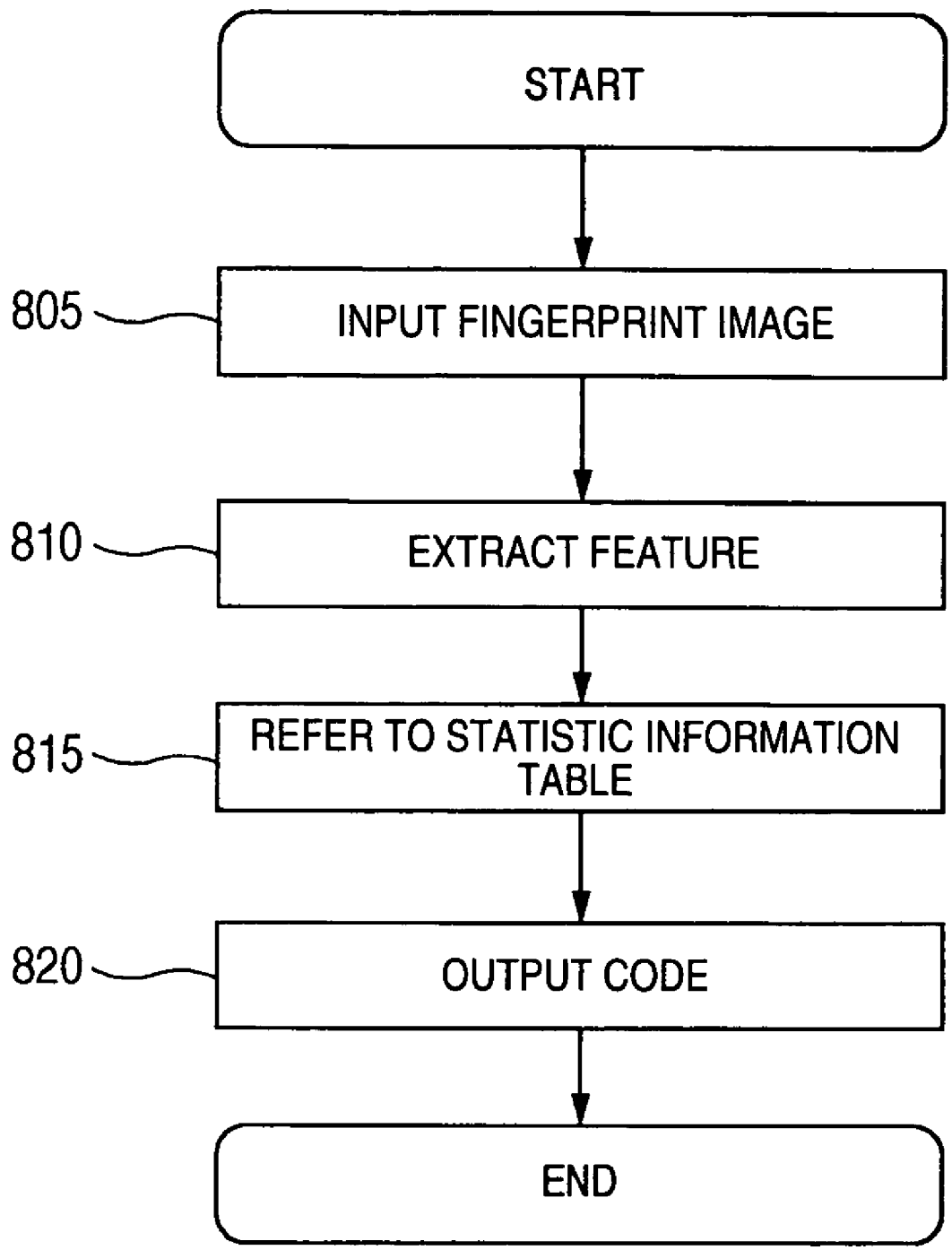
FIG. 5 is a flowchart showing unique code generation processing in the embodiment.

FIG. 5 shows the unique code generation processing of the embodiment in a flowchart. Description will now be given of a procedure of processing to conduct personal authentication. A user who desires to enter a room through the door 130 presents a fingerprint, (which should have been) registered in advance, to the fingerprint sensor 205 (and the input/output interface 104). The sensor 205 obtains fingerprint information and then inputs the information to the biometric information input function 101 (step 805)..

The feature extracting function 102 receives a fingerprint image from the biometric information input function 101 to extract features from the image and temporarily records the number of features in the RAM 203 (step 810). By executing the processing for all features, the feature extracting function 102 finally obtains, for example, the numbers of the five types of features described above.

The statistical analysis function 103 then compares the number of features calculated in step 810 (according to the biometric information for collation) with the statistic information table 110 of the associated feature to find a row of the table 110 in which the number of features for the collation is between the upper and lower limits. The function 103 temporarily records the output value (a unique code within the feature range) of the row in the RAM 203. By executing the processing for all features, the function 103 finally obtains five output values (unique codes).

The statistical analysis function 103 collects the five output values as one output code and delivers the code to the unlock unit 131 (step 820). If the output code from the unique code generator 100 matches a code recorded in the unlock unit 131 in advance, the processing is terminated.

According to the present invention, statistic information of features of biometric information is analyzed to generate a statistic information table unique to the biometric information. According to the statistic information table and new biometric information, a unique value (unique code) for the. biometric information is outputted. This consequently leads to an advantage that an individual person cannot be identified using the statistic information table and the unique code. The statistic information table includes, in addition to the upper and lower limits of features of the biometric information, meaningless information of upper limits, lower limits, and output values. This hence leads to an advantage that it is difficult to predict a unique code using the statistic information table. The unique code outputted from the statistic information table can be freely set. This leads to an advantage that even when the unique code is revealed, the unique code can be easily rewritten. The number of features of the biometric information is used as statistic information of the features of biometric information. This leads to an advantage that it is possible to output a unique code which is robust with respect to fluctuation in the biometric information inputted to the system. By using the geometric contour and the arrangement of feature points of a fingerprint, a unique code which is robust with respect to rotation and parallel displacement of the fingerprint is advantageously outputted.

Therefore, in the personal authentication, security can be satisfactorily guaranteed and efficient operation can be conducted.

While the present invention has been specifically described with reference to the illustrative embodiments, it is not to be restricted by those embodiments. It is to be appreciated that the embodiments can be changed or modified in various ways without departing from the scope of the present invention. There can be considered examples as below.

In the examples, since biometric information is converted into a unique identifier, it is possible to implement personal authentication between a server and a client in which the identifier is used as a password. Specifically, an identifier generated from biometric information of a user is registered to the server side in advance. On the client side, an identifier is generated from biometric information and is sent to the server. The identifier is collated with the identifier register in advance on the server side to thereby conduct authentication of the user.

In another example, a random number r is generated on the server side and is sent to the client and an identifier registered to the server and the random number r are processed using a predetermined operation f to obtain a result V. on the client side, an identifier is generated from biometric information of a user, and the random number r received from the server and the identifier are processed using the same operation f to obtain a result V'. The client sends V' to the server. If V is equal to V', the user can be authenticated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A unique code generating apparatus for generating, according to biometric information representing a physical or behavioral feature of a user, a unique code as a unique value for the biometric information, comprising:
   a statistic information generating module which conducts statistical analysis for a feature of biometric information for registration and generates statistic information;
   a statistic information table generating module which summarizes the statistic information for each biometric information, sets a unique code for each statistic information, and generates a statistic information table unique to the biometric information;
   a unique code extracting module which applies to the statistic information table the statistic information generated by the statistic information generating module according to biometric information for collation and extracts an associated unique code from the table; and
   an output processing module which outputs the unique code extracted by the unique code extracting module to an output interface,
   wherein the biometric information includes fingerprint information,
   wherein the feature of biometric information includes a direction of projected lines in a small area of a fingerprint image,
   wherein the feature of biometric information includes feature points including an end point or a branch point of a projected lines in a small area of a fingerprint image.

2. The unique code generating apparatus according to claim 1, further comprising a unique code arbitrary setting module which sets the unique code to be set for each statistic information in the statistic information table to random information including a character, a numeral, or a code or to arbitrary information received via an input interface.

3. The unique code generating apparatus according to claim 1, further comprising a wrong statistic information setting module which sets to the statistic information table, in addition to the statistic information generated according to the feature of biometric information for registration, wrong statistic information to which a wrong unique code other than the unique code of the associated statistic information is set.

4. The unique code generating apparatus according to claim 1, further comprising a feature range setting module which sets the statistic information in the statistic information table, the statistic information being set in a feature range between an upper-limit value and a lower-limit value using numbers of features of the statistic information generated by the statistic information generator.

5. The unique code generating apparatus according to claim 1, wherein the feature of biometric information includes a geometric contour or arrangement formed by the feature points.

6. A unique code generating method for generating, according to biometric information representing a physical or behavioral feature of a user, a unique code as a unique value for the biometric information, comprising:
   a statistic information generating step of conducting statistical analysis for a feature of biometric information for registration and generating statistic information;
   a statistic information table generating step of summarizing the statistic information for each biometric information, setting a unique code for each statistic information, and generating a statistic information table unique to the biometric information;
   a unique code extracting step of applying to the statistic information table the statistic information generated by the statistic information generating step according to biometric information for collation and extracting an associated unique code from the table; and
   an output processing step of outputting the unique code extracted by the unique code extracting step to an output interface,
   wherein the biometric information includes fingerprint information,
   wherein the feature of biometric information includes a direction of projected lines in a small area of a fingerprint image,
   wherein the feature of biometric information includes feature points including an end point or a branch point of a projected lines in a small area of a fingerprint image.

7. A computer-readable recording medium including a program for implementing on a computer a unique code generating method for generating, according to biometric information representing a physical or behavioral feature of a user, a unique code as a unique value for the biometric information, the program causing performance of:

a statistic information generating step of conducting statistical analysis for a feature of biometric information for registration and generating statistic information;

a statistic information table generating step of summarizing the statistic information for each biometric information, setting a unique code for each statistic information, and generating a statistic information table unique to the biometric information;

a unique code extracting step of applying to the statistic information table the statistic information generated by the statistic information generating step according to biometric information for collation and extracting an associated unique code from the table; and an output processing step of outputting the unique code extracted by the unique code extracting step to an output interface, wherein the biometric information includes fingerprint information, wherein the feature of biometric information includes a direction of projected lines in a small area of a fingerprint image, wherein the feature of biometric information includes feature points including an end point or a branch point of a projected lines in a small area of a fingerprint image.

* * * * *